United States Patent [19]

Wenzel

[11] 3,843,998

[45] Oct. 29, 1974

[54] FISH NOBBING MACHINE

[75] Inventor: Werner Wenzel, Lubeck, Germany

[73] Assignee: Nordischer Maschinenbau Rud., Baader, Lubeck, Germany

[22] Filed: May 15, 1972

[21] Appl. No.: 252,980

[52] U.S. Cl. ............................ 17/60, 17/63, 17/52
[51] Int. Cl. ............................. A22c 25/14
[58] Field of Search ............... 17/60, 58, 61, 63, 52

[56] References Cited
UNITED STATES PATENTS

| | | | |
|---|---|---|---|
| 1,632,200 | 6/1927 | Stafford | 17/60 |
| 1,699,951 | 1/1929 | Christiansen et al. | 17/60 |
| 1,799,948 | 4/1931 | Bergen | 17/60 |
| 2,483,508 | 10/1949 | Smith | 17/60 |
| 3,488,799 | 1/1970 | Danielson | 17/60 |
| 3,525,121 | 8/1970 | Elich | 17/60 |

Primary Examiner—Louis G. Mancene
Assistant Examiner—D. L. Weinhold
Attorney, Agent, or Firm—Richards & Geier

[57] ABSTRACT

In a fish nobbing machine comprising an endless conveyor, which is guided around two end wheels of which one is driven in a suitable manner, and which carries a plurality of U-shaped fish receiving troughs subdivided into body accommodating troughs and head receiving troughs defining a slot between each other, a head cutter including a pair of shearing knives, and a head-intestine extractor formed by a rake-like arm carrying at the end adjacent the head cutter a plurality of head engaging tines, the invention resides in that the head cutter is arranged above the driven end wheel of the conveyor around which the fish receiving troughs are moving downwardly, wherein the pair of knives are operating in the path of movement of the slots formed between the body and the head receiving troughs and are each provided with a recess intersecting the cutting edges of the knives and are forming a substantially circular opening when the knives are closed, i.e., when their cutting edges overlap each other, the opening surrounding the throat of the fish and leaving it uninjured while the head of the fish is cut free to be engaged by the head-intestine extractor to extract with the head the throat, the stomach, and the intestine of the fish out of its body.

7 Claims, 5 Drawing Figures

3,843,998

FISH NOBBING MACHINE

BACKGROUND OF THE INVENTION

1. Field of Invention

Fish nobbing machines are used in the fish industry and serve to remove the heads of the fishes and with it their throats, stomaches and intestines.

2. Description of the Prior Art

A fish nobbing machine is known and described in the Swedish Pat. No. 62 445 comprising end endless conveyor guided around end wheels and carrying a plurality of fish receiving troughs, a head cutter making an incision into the neck of the fish and severing the vertebral column, and a head-intestine extractor including a rake-like arm provided with a plurality of tines engaging the head tearing it away from the body of the fish and with it the throat, the stomach, and the intestines.

This known machine is afflicted with serious disadvantages in that the skulls of the fishes prior to and during the neck cutting operation are not supported so that, on the one hand, it is not assured that the vertebral column is really severed, while on the other hand the throat may be injured or even cut through. Another drawback is to be seen in the fact that the major part of the head is torn away from the body of the fish which is regarded to be objectionable as well in aesthetic as also in hygienic respect. Besides this the longitudinal and possibly the transversely inclined positions of the fish receiving troughs, which are not guided in rails, are not positively fixed with respect to the head cutter.

In fish processing machines in general shearing knives as well as fish receiving troughs are well known, which latter may also be subdivided.

It is an object of this invention to provide a machine of the abovementioned type enabling to severe the vertebral column of the fishes behind the head without injuring the throat, thereby allowing to extract together with the head, after it has been cut loose from the body of the fish, the digestion tract out of the abdominal cavity of the fish. In particular it is aimed to improve the described known machine in such a manner that the head of the fish may be cut free by cutting the skin all around its circumference without injuring the throat.

SUMMARY OF THE INVENTION

The invention is realized in a fish nobbing machine, comprising in combination:

a. an endless conveyor guided around two end wheels journalled in a machine frame;
b. drive means driving one of the wheels;
c. a plurality of U-shaped fish receiving troughs carried by the conveyor with their longitudinal axes disposed transversely to the path of movement and subdivided into a body receiving trough and a head receiving trough defining a slot therebetween;
d. a head cutter arranged above that end wheel about which the troughs move downwardly, the head cutter including a pair of shearing knives of which at least the lower one is received within the slot formed between said body and said head receiving troughs;
e. a head-intestine extractor cooperating with the head cutter and formed by a fork including a plurality of tines With a thus constructed machine it is possible to position the fish, particularly its head in a predetermined position and also to maintain the troughs in this position at the cutting station relative to the head cutter, wherein the latter allows to incise the head all around and severe the vertebral column without injuring the throat.

According to an advantageous embodiment the cutting edges are formed by chamfers the planar sides of the knives contacting each other each cutting edge including an obtuse angle the lower cutting edge diverging upwardly and the upper one downwardly the cutting edges being intersected by recesses disposed at the apexes of the obtuse angles each cutting edge having at least one tooth-like projection formed at one side of the recess.

Preferably the cutting knives are reciprocably driven in counter-directions by cam means arranged on a shaft having a drive connection with one of the conveyor end wheels.

The head cutter may be constructed in such a manner that the cutting knives are vertically slidably guided in support means arranged above the troughs of the conveyor, the cam means including two eccentrics mounted on the shaft in 180° dephased relation to each other and engaging slide members of the knives the lower knife being connected to its slide member by an upwardly extending leg.

In order to allow processing of fishes of differing sizes adjustment means for the head cutter may be provided including according to one embodiment an intermediate wheel arranged in the drive connection between the drive of the conveyor end wheel and the drive shaft of the head cutter the intermediate wheel being shiftable against the force of a spring in dependence on the movement of a feeler sensing the size of the fish.

According to another embodiment of the invention for achieving adjustment of the cutting knives the support means are pivotally adjustable about a stationary axis extending normally to the cutting edges and lockable in a desired position in which the throat of the fish is aligned with the recesses in the cutting edges when the knives are closed.

According to another embodiment of the head cutter the cutting knives are operating as a pair of scissors arranged at one end of arms pivotal about a stationary axis extending normally to the cutting edges, the other ends of the arms being engaged by a cam arranged on the shaft having the drive connection with the end wheel, adjustment means being provided allowing to alter the closing moment of the knives.

In this case the adjustment means may be formed by an adjustable cam.

The preferred embodiment of the head-intestine extractor provides that the head gripper arm extends substantially horizontally and is pivotally connected with its end directed away from the head cutter to two parallel guide rods extending substantially vertically and forming a gripper arm control, one of the guide rods being pivotal about a stationary axis and being formed as a double armed lever carrying at the free end of its shorter lever arm a first cam follower roll, while the other guide rod is a push rod having its lower end pivotally connected to the substantially horizontally extending one arm of a bell crank lever rotatably supported on the stationary axis and carrying at the free end of its substantially vertically extending other arm a second cam follower roll, wherein a shaft extending in parallel relation to the stationary axis rotating in synchronism with the drive of the one conveyor end wheel is carrying a first cam cooperating with the first cam follower roll controlling the longitudinal reciprocating movement of the gripper arm and a second cam cooperating with the second cam follower roll controlling the up and down swinging movement of the gripper arm.

According to the invention the conveyor may either be driven continuously or intermittently.

BRIEF DESCRIPTION OF THE DRAWINGS

FIG. 5 is a side view of the lower knife of the head cutter shown in FIG. 4.

DESCRIPTION OF THE PREFERRED EMBODIMENTS

Figure 1:
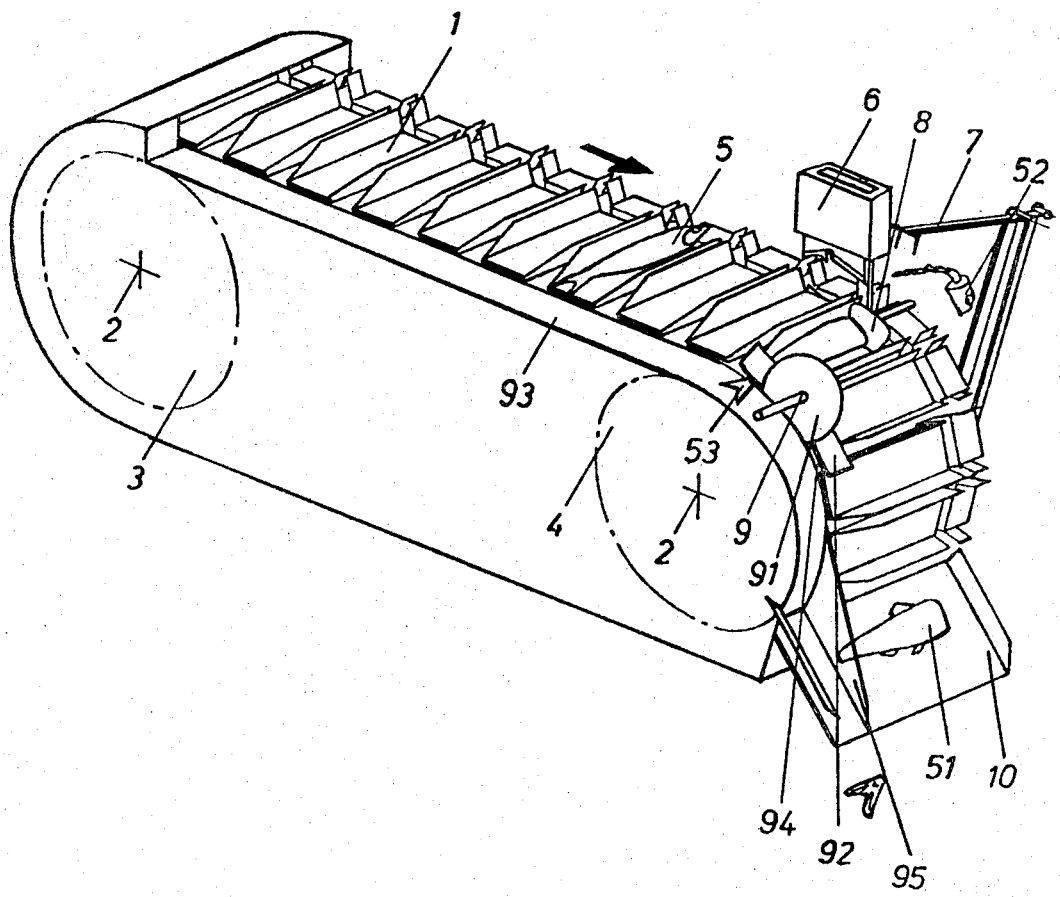
FIG. 1 is a perspective view of the total machine looking upon its right hand side.

Turning now the drawings and more particular to FIG. 1 there are shown two end sprocket wheels 3 and 4 journalled in a not illustrated machine frame, around which sprocket wheels an endless chain conveyor is guided. Preferably the sprocket wheel 4 is driven by a not shown electro motor via an intermediately arranged also not illustrated chain drive, gearing, or Geneva wheel drive moving the chain conveyor 1 in the direction indicated by the arrow. At the left hand side of the machine, above the sprocket wheel 4 there are arranged a head cutter 6, laterally adjacent thereto a head-intestine extractor 7, downstream of the head cutter a fish pusher 8, and behind the latter, at the other right hand side of the machine a tail cutter 9 below which an outlet 10 for the processed fish is provided.

Figure 2:
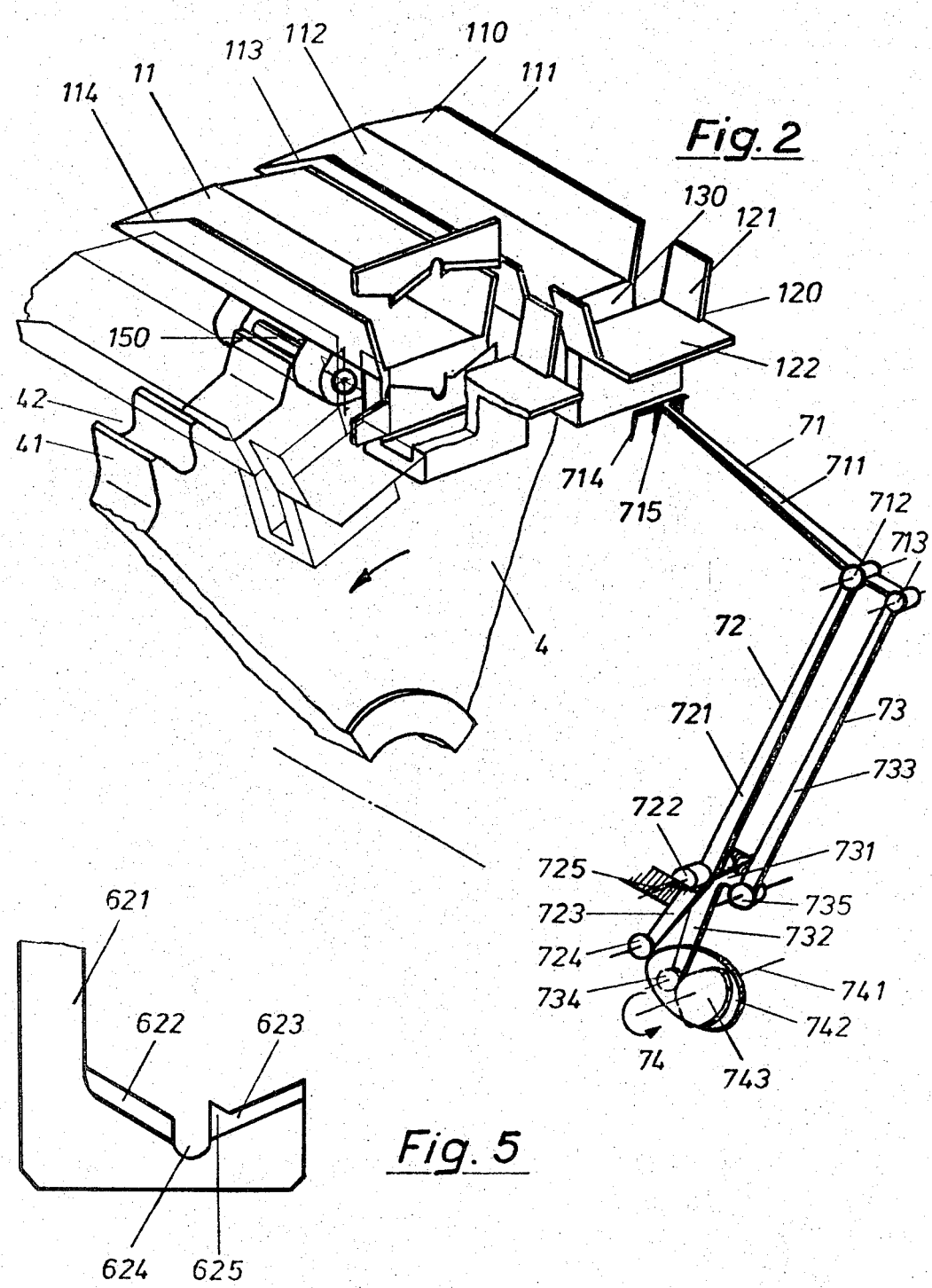
FIG. 2 is a partial perspective view of the machine at the location where the troughs are moving down around one of the end wheels.

The chain conveyor 1 is composed of troughs 11 (see FIGS. 1 and 2) connected to an endless chain by pivot pins 150. Each trough 11 consists of a trough 110 accommodating the body of the fish and a trough 120 receiving the head of the fish both troughs 110 and 120 defining a slot 130 between them and being connected to each other by a connecting web 140 (see FIG. 3). Each trough 110 for the body of the fish is U-shaped including a bottom wall 112, a rear wall 111, and a front wall 113. Each head receiving trough 120 is of U-shaped cross section and includes a support 122 disposed in the plane of the bottom wall 112 and a neck support 121 aligned with the rear wall 111. The exposed parts of the pivot pins 150 connecting the troughs 11 engage the tooth gaps 42 between the teeth 41 of the sprocket wheels 3 and 4.

Figure 4:
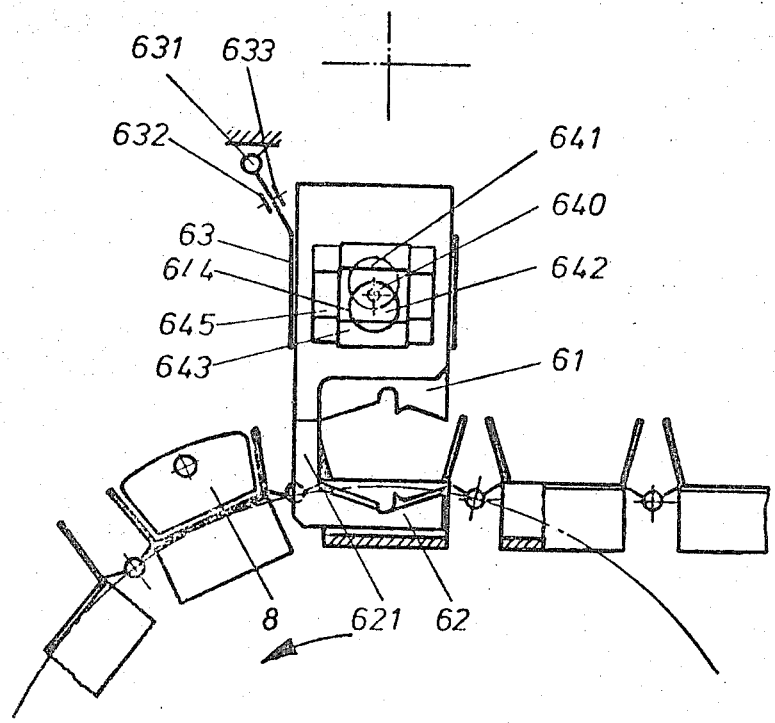
FIG. 4 is a similar view like FIG. 3 but showing a differently constructed head cutter.

The head cutter 6, which is arranged in the zone where the troughs 11 are moving down the sprocket wheel 4, includes a lower knife 62 disposed in the path of movement of the slots 130 at the side of the head receiving troughs 120, and an upper knife 61 disposed laterally of the body receiving troughs 110. Both knives 61 and 62 are vertically movable in a knife support 63 having coulisses 645 formed in slide members, such serving to guide a transversely shiftable sliding block 643. The sliding blocks 643 are carried by two eccentrics 641 and 642 mounted in dephased relation to each other about 180° on a continuously rotating drive shaft 640 for the knives so as to move the two knives in counter direction. FIG. 4 shows the maximum opened position of the knives 61 and 62, wherein also a leg 621 of the hook shaped lower knife 62 is shown.

Both cutting edges 622 and 623 of the lower knife 62 (see FIG. 5) are provide with a chamfer at the side facing the head receiving trough 120 and include a obtuse angle forming a top open V. Analogously the two cutting edges of the upper knife 61 are chamfered at the side facing the body receiving troughs 110 and are forming a downwardly open V. At the apexes of the cutting edges each of the knives 61 and 62 is provided with a recess 624 which are not chamfered, and laterally thereto with a tooth 625 projecting beyond the cutting edges 623. In their closed positions the two knives 61, 62 completely overlap each other with their cutting edges while the two recesses 624 are forming a substantially circular opening.

The knife support 63 is pivotally supported on a stationary axis 631 at the end facing away from the chain conveyor 1 and is lockable in the desired position by two adjustable abutments 632 and 633.

Figure 3:
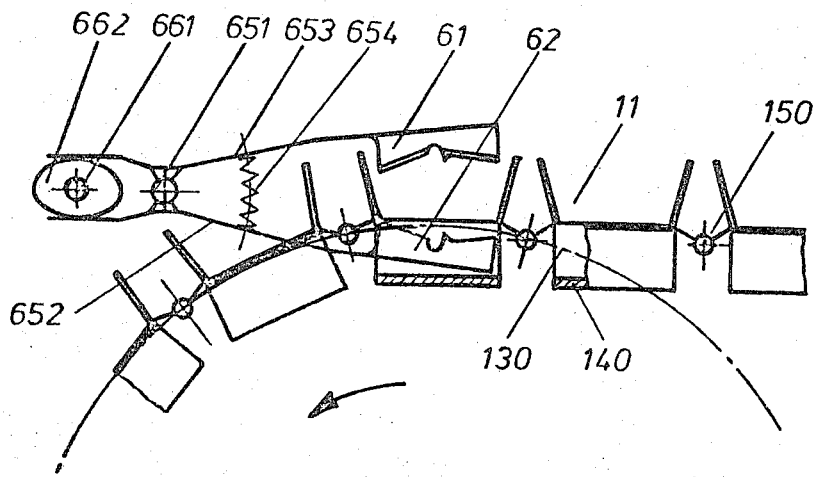
FIG. 3 is a side view of the location shown in FIG. 2 showing a particular embodiment of the head cutter.

In the embodiment of the head cutter shown in FIG. 3 the knives 61 and 62 are carried by knife holders 652 and 653 pivotal in scissor-like manner about a stationary axis 651. The knife holders 652 and 653 are moved in an oscillating manner against the action of a pressure spring 654 by a cam 662 mounted on a drive shaft 661 for the knives.

In order to allow the adjustment of the opening formed by the two recesses 624 with respect to the rear wall of the body receiving trough 110 for different sizes of fish a single adjustment of the abutments 632 and 633, or of the cam 662 on the axis 651 respectively, will suffice, if the catch of the fish is of uniform size. If the catch consists of differing sizes of fish the thickness of each fish may be measured, for example by a feeler, and the head cutter 6 is adjusted correspondingly in accordance with each measurement.

However, in case of a continuously driven chain conveyor 1 it may be more advantageous not to shift the head cutter but to change the closure moment of the knives 62 and 62, for example, by shifting an intermediate wheel disposed between the drive of the chain conveyor 1 and the drive of the drive shaft of the knives in accordance with an individual measurement of the fish.

Adjacent the head cutter the head-intestine extractor 7 is arranged. A double armed lever 721 is supported to pivot about a stationary axis 725 and carries at the end of its downwardly extending lever arm 723 a roller 724, while the end of its upwardly extending lever arm carries a hub 712 of a gripping arm 711. This gripping arm is pivotally connected by a hub 713 to the upper end of a connecting rod 733 having its lower end pivotally connected to the free end of the one arm 731 of a bell crank lever rotatably supported on the axis 725, while the lower end of the other arm 732 carries a roller 734. At its free end the gripping arm 711 carries a rake 715 with a plurality of tines 714.

A shaft 741 is arranged in parallel relation to the axis 725 and carries a pulling cam 742 and a lifting cam 743 driven synchronously with the driven shaft 640, or 661 respectively, for the knives.

Downstream of the head cutter 6 the fish pusher 8 is arranged closely above the bottom wall 112 spaced about the distance between two adjacent troughs 11 and driven in a well known manner. Opposite to the fish pusher at the right hand side of the machine a cone-shaped sheet metal guide 92 is arranged closely fitting the sloping ends 114 of the rear and front walls 111 and 112 of the body receiving troughs 110, and extending past the tail cutter 9 which includes a circular knife 91 driven in a well known manner. A the right hand side of the machine a tail support 93 is mounted coinciding with the plane of the bottom walls 112 of the body receiving troughs 110.

The operation of the machine is as follows:

The fishes are manually placed into the troughs 11 of the horizontally extending upper run of the conveyor in such a way that their heads are pointing to the left hand side, their backs are engaging the rear walls 111 of the body receiving troughs 110, and their upper skull portions lie against the neck supports 121 of the head receiving troughs 120 in such a manner that the rear edges of their gill flaps are aligned with the edges of the slots 130 at the head receiving troughs.

With the troughs 11 advanced in the direction indicated by the arrow the fishes are moved to the return zone of the chain conveyor, and here to the head cutter 6 arranged above the sprocket wheel 4, around which the troughs are moving downwardly. The lower knife 62 of the head cutter is disposed sufficiently deep in the slot 130 that the fish disposed in the trough is moved past the same in such a manner that it does not contact the cutting edges 622 and 623. When a body receiving trough 110 has been advanced so far under the head cutting device that the distance of the leading edge of its rear wall from the edges of the recesses disposed at the side of the teeth 625 is somewhat greater than the distance between the lower edge of the vertebral spine and the outer edge of the neck and of the fish the head cutter is closed by raising the lower knife 62 and lowering the upper knife 61. In this the two teeth 625 engage below the vertebral column of the fish and shift it somewhat in a direction towards its neck, while the throat of the fish is disposed uninjured in the opening formed by the two recesses when the head cutting device is closed. The fish is now cut through by a clean cut cutting through its vertebral column, its skin and the meat part enveloped thereby in the rear of the collar bones, without injuring its throat. Similtaneously with the downward movement of the upper knife 61 also the head gripper 71 of the head-intestine extractor 7 has been lowered upon the head of the fish and its tines 714 have pierced the head. After the knives 61, 62 of the head cutter have closed the head gripper 71 starts its extraction movement in a direction of the extended longitudinal axis of the through and pulls together with the head, the throat, the stomach, and the small intestine connected one to another through the opening formed by the two recesses 624 out of the fish after the small intestine has been torn-off adjacent the anus. The nobbed fish 51 remaining in the body receiving trough 110 then enters the effective zone of the fish pusher 8 which, upon arrival of a body receiving trough, is released thereby shifting the fish by the action of a spring until its movement its terminated by the root of its tail engaging a slot 94 formed between the tail support 93 carrying the tail fin and the guide 92. Upon continued advance of the body receiving trough the tail fin 53 is cut-off by the circular knife 91 of the tail cutter 9 which, separated from the now completely processed fish 51 by a partition wall 95, will slide down the discharge chute 10.

What is claimed:

1. A fish nobbing machine, comprising a machine frame, two end wheels journalled in said frame, an endless conveyor guided around said end wheels for downward movement, driving means driving one of said end wheels, a plurality of U-shaped fish receiving troughs carried by said conveyor and having longitudinal axes extending transversely to the path of movement, said troughs being divided into a body receiving trough and a head receiving trough with a slot therebetween, a head cutter located above that end wheel about which said troughs move downwardly, said head cutter having two cooperating shearing knives with cutting edges and recesses intersecting said edges, a drive shaft for said knives, and a drive connection between said driving means and said drive shaft, adjustment means for said head cutter having an intermediate wheel located in said drive connection, a spring shifting said intermediate wheel, a feeler sensing the size of fish upon a trough and actuating said spring, said adjustment means changing the centers of said recesses at the moment of closing for processing differently sized fish, and a head-intestine extractor cooperating with said head cutter and having a fork with a plurality of tines.

2. A fish nobbing machine according to claim 1, wherein said head cutter comprises arms, a stationary axis extending normally to said cutting edges, said arms pivoting about said axis and having ends carrying said shearing knives, whereby said shearing knives operate as a pair of scissors, a cam connected with said drive shaft and engaging other ends of said arms, and adjustment means altering the closing moment of said knives.

3. A fish nobbing machine according to claim 2, wherein said adjustment means comprise an adjustable cam.

4. A fish nobbing machine according to claim 1, wherein said shearing knives are driven reciprocally in counter direction, one of said shearing knives being a lower knife, said lower knife being received in said slot.

5. A fish nobbing machine according to claim 4, wherein said lower knife is hook shaped.

6. A fish nobbing machine according to claim 1, wherein the cutting edges of the shearing knives extend in a V-shaped manner with the openings of the V pointing at each other, said recesses being located at the apexes of the V, each cutting edge having at least one tooth-like projection upon one side of the recess.

7. A fish nobbing machine according to claim 2, wherein said adjustment means alter the distance between centers of said recesses and a wall of an approaching trough for processing differently sized fish.

* * * * *